United States Patent Office 2,995,531

Patented Aug. 8, 1961

2,995,531

STABLE COATING COMPOSITIONS CONTAINING A POLYISOCYANATE AND A POLYAMIDE

George A. Hudson, New Martinsville, W. Va., assignor to Mobay Chemical Company, Pittsburgh, Pa., a corporation of Delaware No Drawing. Filed Sept. 8, 1958, Ser. No. 759,396
5 Claims. (Cl. 260—18)

This invention relates generally to novel coating compositions and, more particularly, to room temperature stable coating compositions curable at elevated temperatures which are based on mixtures of compounds having primary and/or secondary amine groups with adducts prepared from organic polyisocyanates and monoalcohols.

Up to this time, a storage stable coating composition containing an organic polyisocyanate and a compound having amine groups capable of reacting therewith to form a solid film has not been available because as soon as the organic polyisocyanate and the compound containing amine groups are mixed together in a solvent therefor, reaction occurs with accompanying gelation. The heretofore attempts to make storage stable coatings have always involved the use of a polyisocyanate having unreacted NCO groups or an adduct of a polyisocyanate and phenol. The adduct ordinarily will not split at the urethane linkages to form a free isocyanate unless it is heated to temperatures of about 150° C. or higher, but when the adduct is mixed with a compound having amine groups and a suitable solvent therefor, this splitting occurs with the liberation of a compound having unreacted NCO groups even at room temperatures. Substantially instantaneous reaction takes place between the isocyanate and the amine groups and gelation occurs. Consequently, it has been impossible to prepare a mixture of compounds containing primary and/or secondary amine groups with the adduct prepared from phenol and an isocyanate for use in coating compositions which are to be stable at room temperature but react at elevated temperatures to form a solid coating or film.

Moreover, although it has been heretofore possible to formulate water emulsion coating compositions containing polyhydroxyl compounds and an adduct of an organic polyisocyanate and a phenol, the adduct will begin to dissociate at temperatures below the boiling point of water so that the coating film obtained has undesirable physical properties, such as, poor gloss and a generally poor film appearance. These deleterious effects are attributed to some reaction of water with dissociated urethane groups. It has, however, heretofore been impossible to use a compound having $NH_2$ groups capable of reacting with an NCO group in a water emulsion system with a phenol-organic polyisocyanate adduct.

It is, therefore, a primary object of the present invention to provide room temperature stable coating compositions which are curable at elevated temperatures and which comprise a mixture of a compound having primary and/or secondary amine groups and an adduct prepared from an organic polyisocyanate and monoalcohol. Another object of the present invention is to provide room temperature stable coating compositions of the above type which are nontoxic and thus may be applied without resort to expensive and cumbersome protective apparatus, Furthermore, the coating compositions may be applied by any convenient method, such as spraying, without danger to the person applying the material. A further object of the present invention is to provide a coating composition of the above type which, after application and curing, results in high-gloss, hard but flexible coating which exhibits chemical and solvent resistance. Still another object of the present invention is to provide a coating composition of the above type which may be formulated with water to provide an economical emulsion system which substantially eliminates the hazard of fire during application. A still further object of the present invention is to provide room temperature stable compositions which may be cured at elevated temperatures to form a solid elastomeric compound. Still another object of the present invention is to provide a method for making storage stable coating compositions.

The foregoing objects and others are accomplished in accordance with the present invention, generally speaking, by providing a coating composition containing an adduct prepared from an organic polyisocyanate and an alcohol, with a compound having primary and/or secondary amine groups to form a room temperature stable coating composition. This mixture may then be applied to any suitable substrate and cured at elevated temperatures such as from about 250° F. to about 600° F. At these higher temperatures, the reactivity of the amine groups is such to enable it to break the urethane link of the adduct and react with the freed NCO groups, to form a substituted urea. The alcohol released may either volatilize or remain in the mixture as a plasticizer depending essentially on its boiling point. Furthermore, it has been found that isocyanate groups are liberated in a manner which indicates that in addition to the amine group, products of the amine and isocyanate reaction can break the urethane bond of the adduct.

A sufficient quantity of alcohol is used to react with all the organic polyisocyanate and to insure that no free isocyanate groups are present. The formation of the adduct may be illustrated by the following equation:

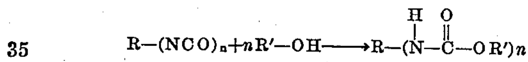

wherein R is any suitable alkyl, cycloalkyl, or aryl radical, R′ is any suitable alkyl, cycloalkyl, or aralkyl radical, and $n$ is an integer of from 2 to 4. The reaction between the organic polyisocyanate and the alcohol is exothermic, therefore, the polyisocyanate and the alcohol are preferably admixed in a suitable solvent media therefor, and at temperatures no higher than 80° C. and, preferably, below 50° C. to minimize the exotherm effect.

The polyisocyanate-alcohol adduct is preferably admixed with the compound containing primary and/or secondary amine groups in ratios of from about 0.5 to about 2.0 urethane groups for each amine group. When the mixture is heated to curing temperatures, it is theorized that an urethane-amine complex is formed prior to the splitting out of the alcohol, which prevents the loss of monomeric polyisocyanate. This reaction mechanism may be illustrated by the following equation:

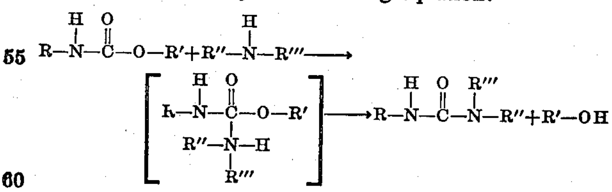

wherein R is any suitable alkyl, cycloalkyl, or aryl radical having at least one other urethane grouping, R′ is any suitable alkyl, cycloalkyl, or aralkyl radical, R″ is an alkyl radical containing other primary and/or secondary amines, and R‴ is a member selected from the group consisting of a hydrogen atom and an alkyl radical containing other primary and/or secondary amines. Suitable solvents may be added, if desired, so that the composition may be in a convenient form and to facilitate the application of the composition to suitable substrates by brushing, spraying, or any other convenient method.

In one preferred embodiment of the invention, the coating composition is formulated with water to provide economical water-thin emulsions which substantially reduces the fire hazard when the composition is applied. This formulation is accomplished by adding a minor amount of glacial acetic acid to the compound having primary and/or secondary amine groups. Preferably, the glacial acetic acid should be added in amounts of from about 0.02 to about 0.2 equivalent for each equivalent of the compound having primary and/or secondary amine groups. The glacial acetic acid and the compound having primary and/or secondary amine groups forms a salt complex of the formula

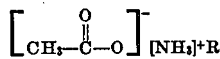

wherein R is an alkyl radical containing primary and/or secondary amines. The above salt complex serves as an emulsion base. The mixture of the compound having primary and/or secondary amine groups and glacial acetic acid is admixed with the polyisocyanate-alcohol adduct prior to the addition of water. When the emulsion is applied to a substrate and heated, the water will volatilize before the composition reaches curing temperatures, thus preventing undesired side reactions between the polyisocyanate and water.

The coating composition may be cured at elevated temperatures by any convenient method, such as, by baking in ovens or with banks of infrared heat lamps. Curing temperatures are preferably from about 325° F. to about 425° F. in order to realize cures in from about 10 to about 30 minutes, although curing temperatures of from about 250° F. to about 600° F. may be employed if desired.

Any suitable compound having available primary and/or secondary amine groups may be used in accordance with the present invention. Preferably, the compound should have molecular weights of from about 1,000 to about 10,000.

Particularly suitable compounds having available amine groups are the polyamide resins which may have terminal reactive primary amine groups and/or reactive secondary amine groups spaced along their molecules.

Polyamide resins may be produced by a condensation reaction between dimerized fatty acids, such as, dimerized linoleic acid, with lower aliphatic polyamines, such as, for example, ethylene diamine or diethylene triamine, so that the final product will have available amine groups. The more highly functional amines, such as, diethylene triamine, are preferred because the polyamide resins produced by a condensation reaction between a dimerized fatty acid and diethylene triamine provide resins having a lower melting point and have free amine groups spaced along the polymer. A suitable process for the manufacture of polyamide resins is disclosed in United States Patent No. 2,450,940, which issued October 12, 1948, to John C. Cowan et al. and assigned to the United States of America as reprecented by the Secretary of Agriculture. Theoretically, if the dimer is represented by HOOC—R—COOH and the diamine by $H_2N—R'—NH_2$, there results, by condensation, a theoretical intermediate represented by $HOOC—R—CONH—R'—NH_2$. This molecule is highly functional and can react with other molecules of dimer acid and diamine. As the reaction continues, a long chain results having a molecular weight of up to about 10,000 or more. By substituting a polyamine for the diamine, the condensation with dimer acid will yield polyamides which contain both primary and secondary amine groups spaced along the molecule.

Any suitable solvent may be used in formulating the coating composition provided by this present invention. A suitable solvent must not contain any groups capable of reacting with $NH_2$ groups. Examples of suitable solvents include xylol, methyl ethyl ketone, butyl acetate, and the like.

Any suitable pigments may be used in formulating the coating composition provided by the present invention to impart a distinctive color thereto. Examples of suitable pigments include iron oxide, titanium oxide, carbon black, and the like.

In the preparation of the organic polyisocyanate and monoalcohol adduct any suitable organic polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidine and butylidene diisocyanates; the cycloalkylene compounds such as cyclopentylene-1,3, cyclohexylene-1,4, and cyclohexylene-1,2, diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4 or 2,6-tolylene, or mixtures thereof, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanate triphenyl methane, 1,3,5,-triisocyanate benzene, and 2,4,6-triisocyanate toluene; and the tetraisocyanates such as 4,4'-diphenyl-dimethyl methane 2,2',5,5'-tetraisocyanate; the polymerized polyisocyanates, such as tolylene diisocyanate dimers and trimers, and the like.

Any suitable aliphatic, cycloaliphatic, or aromatic alkyl monoalcohol may be used in accordance with the present invention such as, for example, aliphatic alcohols such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like, the aromatic-alkyl alcohols, such as, phenylcarbinol, methylphenylcarbinol, and the like. Minor amounts of even higher molecular weight relatively non-volatile monoalcohols may be used, if desired, to serve as plasticizers in the coatings provided by this invention.

The invention is further illustrated by the following examples without being restricted thereto, the parts being by weight.

*Example 1*

To 84 parts of n-butanol and 172 parts of xylol was added 88 parts toluylene diisocyanate slowly and with stirring. The xylol was used to minimize the exotherm effect of the butanol toluylene diisocyanate reaction. The mixture was allowed to stand for four hours, then the volatile material was driven off by heating the mixture in open pans for one hour at 400° F. The residue was the reaction product of toluylene diisocyanate and butanol. This material is fluid when warm at 200° F. and will crystallize at room temperature.

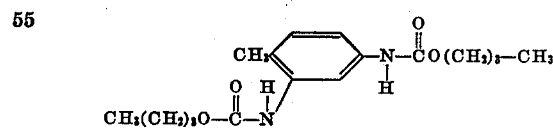

To 240 parts of the above product in about 240 parts methyl ethyl ketone was added about 500 parts of a 50% solution in xylol of a polyamide resin which is a condensation product of dimerized linoleic acid and diethylene triamine. The polyamide resin has an amine value of from about 210 to about 230 and a viscosity of about 500 to about 750 poises at 40° C. (Brookfield Viscometer—#6 spindle, 4 r.p.m.). To this mixture were added 109 parts of $TiO_2$ (Rutile) and 4 parts carbon black.

When this material was applied by spray to steel panels and baked for one-half hour at 400° F., a light gray coating film is obtained which shows good hardness, flexibility, impact resistance as well as resistance to chemicals and solvents.

*Example 2*

150 parts of n-amyl alcohol toluylene diisocyanate adduct was prepared in accordance to Example 1 and admixed with 150 parts of methyl ethyl ketone. To this mixture was added a solution consisting of 500 parts of a 50% solution in xylol of the polyamide resin described in Example 1 and 12 parts of glacial acetic acid. To this resulting mixture 210 parts of water was added and a smooth homogeneous emulsion resulted. The material was sprayed on aluminum foil and after baking for one-half hour at 400° F. a light-gold hard but flexible film resulted.

*Example 3*

To 187 parts of lauryl alcohol and 274 parts xylol were added 87 parts tolylene diisocyanate slowly and with stirring. The xylol was used to minimize the exotherm effect of the lauryl alcohol-tolylene diisocyanate reaction. The mixture was allowed to stand for 4 hours, then the volatile material was driven off by heating the mixture in open pans for 1 hour at 400° F. The residue was the reaction product of tolylene diisocyanate and lauryl alcohol. The adduct is fluid when warm at 200° F. and will crystallize at room temperature.

To about 272 parts of the above product at 100° C. was added 173 parts of a 50% solution in xylol of a polyamide resin which is a condensation product of dimerized linoleic acid and diethylene triamine and has an amine value of from about 290 to about 320 and a viscosity of about 80 to about 120 poises at 40° C. (Brookfield Viscometer—#6 spindle, 4 r.p.m.).

The mixture is then intimately mixed and cured in a suitable container at about 420° F. to obtain an opaque rubber-like material similar to a "soap eraser" in both appearance and physical characteristics. The solid elastomer is saturated with monomeric lauryl alcohol which acts as a plasticizer.

*Example 4*

160 parts of n-butanol tolylene diisocyanate adduct was prepared in accordance with Example 1 and admixed with 160 parts of methyl ethyl ketone. To this mixture was added a solution consisting of 500 parts of a 50% solution in a xylol of the polyamide resin described in Example 1.

When applied to steel panels by brush and baked for one-half hour at 350° F., a light gold-colored clear flexible film is obtained.

*Example 5*

320 parts of n-butanol tolylene diisocyanate adduct was prepared in accordance with Example 1 and admixed with 380 parts of methyl ethyl ketone. To this mixture was added a solution consisting of 500 parts of a 50% solution on the xylol of the polyamide resin described in Example 1.

When the material was sprayed on aluminum foil and baked for 10 minutes at 400° F., a clear, but very flexible film possessing good chemical resistance is obtained.

*Example 6*

To 84 parts of n-butanol and 272 parts of xylol was added 188 parts of xylylene diisocyanate slowly and with stirring. The xylol is used to minimize the exotherm effect of the butanol-xylylene diisocyanate reaction. To further minimize the exotherm effect, the reaction was water-cooled to keep the reaction below 50° C. When evidence of rapid reaction had stopped (no temperature rise when the reaction vessel was removed from the water bath) the reactants were then stored 16 hours at 50° C. Next, the reactants were placed in open pans and heated 3 hours at 400° F. to assure evaporation of the xylol. The xylylene diisocyanate butanol adduct is a waxy solid at room temperatures. The adduct dissolves quickly as a 50% solid solution in a slightly warm mixture of methyl ethyl ketone/methanol 1:1 solvent.

To about 336 parts of the above solution was added about 346 parts of a 50% solution in xylol of the polyamide resin described in Example 3.

When this mixture was applied by brush to steel panels and cured for 15 minutes at 420° F., a tough flexible film is obtained.

*Example 7*

To 110 parts of cyclohexanol and 287 parts of methyl ethyl ketone was added 177 parts of toluylene diisocyanates slowly and with stirring. The methyl ethyl ketone is used to minimize the exotherm effect of the cyclohexanol toluylene diisocyanate reaction. To further minimize the exotherm effect, the reaction was water-cooled to keep the reaction below 50° C. When evidence of rapid reaction had stopped (no temperature rise when the reaction vessel was removed from the water bath) the reactants were then stored 16 hours at 50° C. Next, the reactants were placed in open pans and heated for 3 hours at 400° F. to assure evaporation of the methyl ethyl ketone. The adduct thus prepared dissolves quickly as a 50% solid solution in a slightly warm mixture of methyl ethyl ketone/methanol 1:1 solvent.

To about 374 parts of the above solution was added about 346 parts of a 50% solution in xyol of the polyamide resins described in Example 3.

When this mixture is applied by spraying to steel panels and cured for 15 minutes at 400° F., a tough flexible film is obtained.

Polyurethane coating compositions derived in accordance with this invention are characterized by extreme high gloss, good hardness, flexibility, impact resistance, and chemical and solvent resistance. Ratios of the monoalcohol organic polyisocyanate adduct to the polyamine resin are preferably from between 0.5 to 2.0 urethane groupings for each amine group. Generally, the higher the NCO-amine ratio, the harder, more chemical and solvent resistance the material but with less flexibility.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method of making a storage stable, water emulsion, coating composition which comprises admixing a minor amount of glacial acetic acid with a polyamide containing a member selected from the group consisting of primary and secondary amino groups, said polyamide having a molecular weight of from about 1,000 to about 10,000 with an adduct prepared by reacting an excess of a monohydric alcohol with an organic polyisocyanate, so that the ratio of the urethane groups in said adduct to the active amino groups in said organic compound is from about 0.5 to about 2.0, and mixing the aforesaid mixture with water to form an aqueous emulsion.

2. As a new composition of matter, a mixture comprising a polyamide containing a member selected from the group consisting of primary and secondary amino groups and having a molecular weight of from about 1,000 to about 10,000 and the reaction product obtained when all of the —NCO groups of an organic polyisocyanate have been reacted with an —OH group of a monohydric alcohol having its said —OH group attached to a carbon atom of an aliphatic chain.

3. The composition of claim 2 wherein said mixture is dissolved in an inert organic solvent therefor.

4. As a new composition of matter, an emulsion containing water, acetic acid and a mixture comprising a polyamide containing a member selected from the group consisting of primary and secondary amino groups and having a molecular weight of from about 1,000 to about 10,000, and the reaction product obtained when all of the —NCO groups of an organic polyisocyanate have been reacted with an —OH group of a monohydric alcohol having its said —OH group attached to a carbon atom of an aliphatic chain.

5. A method for making a storage stable coating composition which comprises mixing at a temperature below about 250° F. a polyamide containing a member selected from the group consisting of primary and secondary amino groups and having a molecular weight of from about 1,000 to about 10,000, and the reaction product obtained when all of the —NCO groups of an organic polyisocyanate have been reacted with an —OH group of a monohydric alcohol having its said —OH group attached to a carbon atom of an aliphatic chain.

References Cited in the file of this patent

UNITED STATES PATENTS

| | | |
|---|---|---|
| 2,512,634 | Fisher et al. | June 27, 1950 |
| 2,675,369 | Scrutchfield | Apr. 13, 1954 |
| 2,824,848 | Wittcoff | Feb. 25, 1958 |
| 2,864,780 | Katz et al. | Dec. 16, 1958 |

FOREIGN PATENTS

| | | |
|---|---|---|
| 150,416 | Australia | Mar. 5, 1953 |
| 1,108,785 | France | Sept. 14, 1955 |
| 895,527 | Germany | Nov. 2, 1953 |